(No Model.) 2 Sheets—Sheet 1.
J. H. POLLOK.
GOLD CHLORINATING PROCESS.
No. 456,844. Patented July 28, 1891.
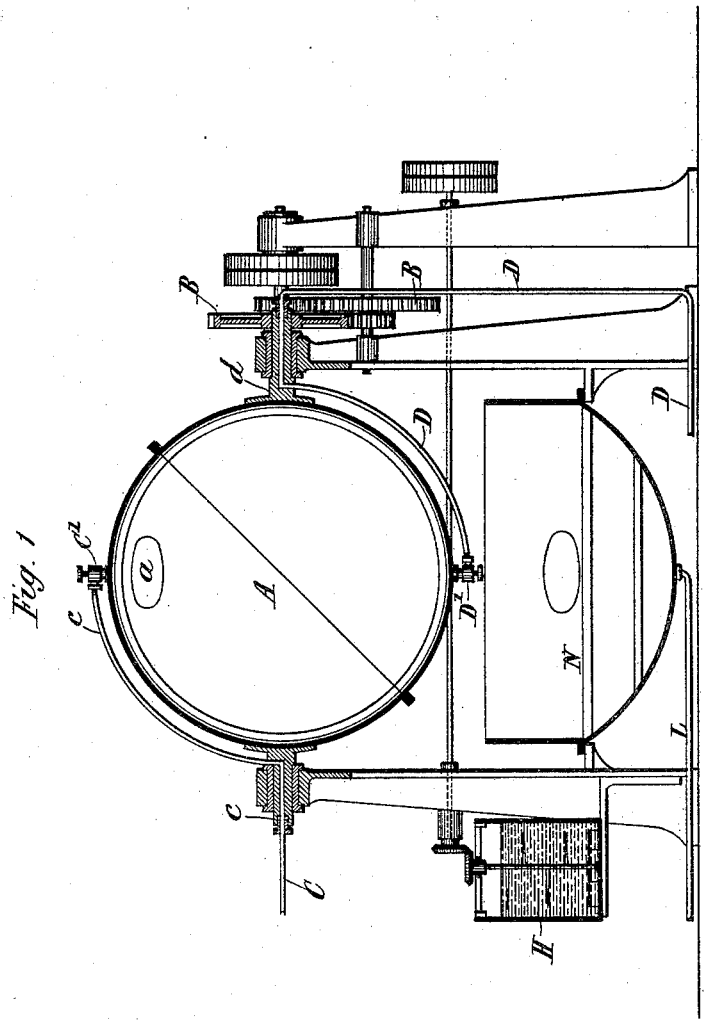
Witnesses:
Inventor:
James Holmes Pollok
By E. B. Clark
Attorney

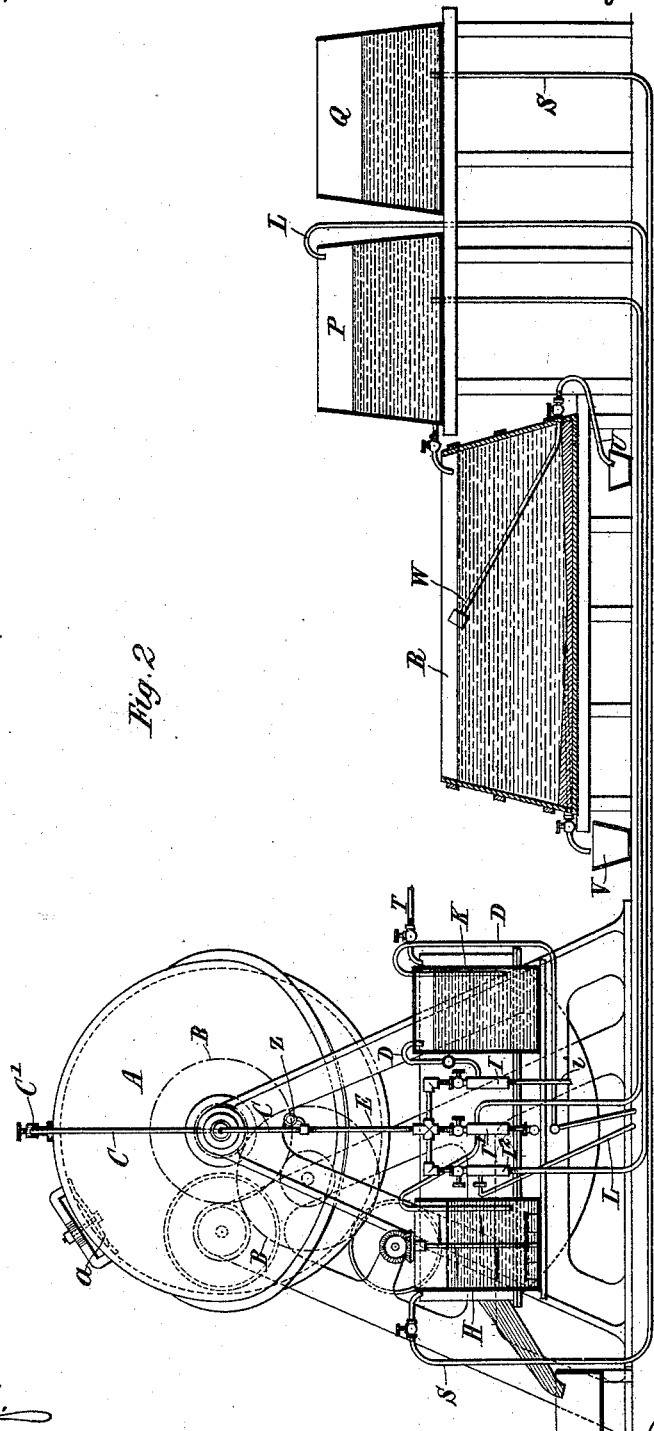

UNITED STATES PATENT OFFICE.

JAMES HOLMS POLLOK, OF GLASGOW, SCOTLAND.

GOLD-CHLORINATING PROCESS.

SPECIFICATION forming part of Letters Patent No. 456,844, dated July 28, 1891.

Application filed January 6, 1890. Serial No. 336,029. (No model.)

*To all whom it may concern:*

Be it known that I, JAMES HOLMS POLLOK, of 27 St. Vincent Place, Glasgow, Scotland, have invented certain new and useful Improvements in Gold-Chlorinating Processes, of which the following is a specification.

This invention relates to the improvement of the method of extracting gold from auriferous ores, known as the "wet method," wherein the ore, previously prepared, if necessary, is subjected in a closed vessel to the action of chlorine, bromine, or similar reagent, whereby the gold is dissolved and rendered capable of extraction from the ore by filtration. Most commonly chlorine gas is used for dissolving the gold, and this is usually obtained from bleaching-powder or chloride of lime, which is fed into the chlorinating-vessel containing the ore and a certain amount of water with a suitable acid, which acts upon the bleaching-powder and liberates the chlorine gas therefrom. To make the chlorine gas act efficiently on the gold, pressure in many forms has been applied within the vessel, and, among other means employed, water has been forced into the vessel containing the ore and the chlorine, according to a plan previously invented and patented by myself under date November 12, 1889, No. 415,060. After the solution of the gold by the chlorine is completed it becomes necessary to deal with the excess of chlorine contained in the vessel, which may not only very easily become a waste product, but may be a positive nuisance owing to the noxious fumes which escape on the opening of the vessel to empty out the ore and dissolved gold.

Plans have been adopted to allow the free chlorine to escape into closed chambers containing slaked lime, which re-absorbs the chlorine and renders it suitable for use over again; but the water in the vessel contains a large quantity of chlorine which must be freed therefrom by the application of considerable heat. It is to render unnecessary these closed lime-chambers, the construction of which involves a considerable outlay, that my invention is directed, at the same time effecting the closest economy in the use of the chlorine.

According to my invention I submit the ore, prepared by crushing or roasting, if necessary, to the action of chlorine in a closed chlorinating-vessel in the usual way or in accordance with my patented process before mentioned, and after treatment, prior to the removal of the ore and dissolved gold, I introduce into the vessel, preferably in the form of a cream, slaked lime or similar alkali or alkaline earth in sufficient quantity to absorb or neutralize the chlorine which has not been used in the solution of the gold. In thus introducing the lime care must be taken to introduce no more lime than will absorb the excess of chlorine; otherwise the gold will be caused to give up its chlorine, which has a strong affinity for the lime, and will be precipitated, a thing which is to be avoided in the chlorinating-vessel. The free chlorine or the chlorine to be neutralized may be determined by titrating a definite portion of the chlorinated solution (after previous addition of iodide of potassium) with a standard solution of hydrosulphite of soda ($Na_2S_2O_3$) and calculating the quantity of lime to be added from this test—*i. e.*, one molecule of slaked lime $Ca(Ho)_2$ is added for each double atom of free chlorine $Cl_2$ found in the chlorinated solution. The operation of making this determination can be readily performed by any chemist.

The apparatus which I propose to employ for carrying the above plan of absorbing the excess of chlorine into effect is illustrated in the accompanying drawings, whereof—

Figure 1 is a transverse section, and Fig. 2 is a plan view partly in section.

A is the chlorinating-vessel, which in this case is spherical, and is mounted on trunnions, so as to be capable of rotation. The vessel A must be of a strong material and lined with wood and lead or other substance capable of resisting the chlorine or other reagent employed to dissolve the gold, or earthenware bowls with flanges bolted together may be employed. Into this vessel is fed through a man-hole $a$, first the bleaching-powder from which the chlorine is obtained, then the prepared ore, and then the acid for liberating the chlorine. This order of loading is adopted in order to avoid the generation of gas before the cover to the man-hole is secured. The trunnions $c$ and $d$ of the vessel A are hollow, or partially so, to permit the passage of the pipes C D, leading to the interior of the vessel through the cocks C' D', preferably on opposite sides of the vessel, without interfering with the rotation.

On one side of the machine is arranged suitable gearing B for giving rotary motion to the vessel A.

After the vessel A is loaded and closed all the air that there may be contained therein is displaced by water, or preferably, it is sucked out by the steam-injector I through the cock D' and pipe D and delivered through the pipe $i$ into the open air. The cock D' is then closed and water, or preferably the liquor from the last charge contained in the vat P, is thrown into the vessel A by the injector I', situated beside the injector I and actuated by the same steam-pipe E. By this means a pressure may be communicated to the mass under treatment and maintained at any desired degree up to whatever pressure may be in the steam-boiler or whatever less pressure may be deemed desirable, as indicated by the gage Z in the pipe C, through which pipe and cock C' the liquor is introduced to the vessel A. This mode of introducing pressure to the vessel also facilitates the application of heat, which at about 60° centigrade is found advantageous to the chlorinating process. After continuing the rotation of the vessel sufficiently long to allow of the solution of the gold, slaked lime or other alkali in the form of a cream or of a solution is introduced into the vessel A, the small overflow-tank K, which is closed except for the pipe D passing through it, being opened to receive the excess of liquor from the cock D' when the lime is introduced. The tank H is provided to contain the lime, which is kept continually stirred by the stirrer therein, actuated by suitable bevel-gearing. The lime is thrown into the vessel A by the injector I', which is provided with a two-way cock to cut off the water-supply and turn on the alkali. The rotation of the vessel A is continued just so long as to allow the lime to neutralize the excess of chlorine which exists in the said vessel without precipitating the gold. The contents of the vessel A are then emptied onto the filter N to remove the solid matters, which filter may be of any suitable construction. From thence the strong liquors, including the chloride of lime in solution, are delivered by the injector I² through the pipe L to the vat P, whence they are taken and reinjected into the vessel A when recharged. The vat Q contains the washings of the previous charge, which are again run through the filter by the pipe S and returned by the injector to the vat R. Fresh water from the pipe T is then used and finally sent to the vat Q, to be in its turn reused. Thus while the strong liquors are kept in the vat P, the strong washings from each charge accumulate in the vat R, and at the end of the day's operation the strong liquor in P is likewise run into the vat R and the gold precipitated in the usual manner. The gold having settled, the liquors are run off and passed through a final filter, preferably of charcoal and sawdust mixed, if thought desirable.

W is a flexible pipe within the vat R, with a float which keeps it just beneath the surface of the liquor. The bottom of the vat R is preferably concave, and from the lowest point passes a pipe, by which the gold precipitate can be washed into suitable receptacles V.

From the foregoing explanation it will be readily understood that the whole of the excess of chlorine gas is not only neutralized and its fumes rendered innocuous when the vessel is opened after the chlorinating operation, but it is secured for reuse by absorption in the lime or similar alkali, and injected again into the same or another chlorinating vessel with a fresh charge and a little additional bleaching-powder, if necessary, to supply the deficiency caused by the gold. In this way a great economy of bleaching-powder is effected, for the same chlorine may be used an indefinite number of times, a comparatively small amount being absorbed by the gold at each fresh charge.

Having now particularly described and ascertained the nature of my invention, I declare that what I claim is—

The improvement in the wet method of extracting gold from ores, consisting in subjecting the auriferous ores to the action of chlorine in a closed vessel, and then after the chlorinating operation neutralizing and absorbing the excess of chlorine by adding in the chlorinating-vessel a suitable quantity of alkali, substantially as described.

JAMES HOLMS POLLOK.

Witnesses:
CHARLES W. WAINWRIGHT,
45 *West George Street, Glasgow, Law Clerk.*
WILL. TEMPLETON,
45 *West George Street, Glasgow, Law Apprentice.*